US011995182B2

(12) United States Patent
Shivanna

(10) Patent No.: US 11,995,182 B2
(45) Date of Patent: *May 28, 2024

(54) BASEBOARD MANAGEMENT CONTROLLER TO PERFORM SECURITY ACTION BASED ON DIGITAL SIGNATURE COMPARISON IN RESPONSE TO TRIGGER

(71) Applicant: HEWLETT PACKARD ENTERPRISE DEVELOPMENT LP, Houston, TX (US)

(72) Inventor: Suhas Shivanna, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 351 days.

This patent is subject to a terminal disclaimer.

(21) Appl. No.: 16/904,045

(22) Filed: Jun. 17, 2020

(65) Prior Publication Data

US 2020/0320193 A1 Oct. 8, 2020

Related U.S. Application Data

(63) Continuation of application No. 15/883,519, filed on Jan. 30, 2018, now Pat. No. 10,719,604.

(51) Int. Cl.
*G06F 21/55* (2013.01)
*G06F 9/4401* (2018.01)
(Continued)

(52) U.S. Cl.
CPC .......... *G06F 21/554* (2013.01); *H04L 9/0863* (2013.01); *H04L 9/0897* (2013.01);
(Continued)

(58) Field of Classification Search
CPC ........ G06F 21/50; G06F 21/55; G06F 21/554; G06F 9/4401; G06F 2221/034; H04L 9/0861; H04L 9/0863; H04L 9/0894; H04L 9/0897; H04L 9/32; H04L 9/3226; H04L 9/3247; H04L 9/3271
See application file for complete search history.

(56) References Cited

U.S. PATENT DOCUMENTS 6,584,565 B1 * 6/2003 Zamek ................. H04L 9/3263
713/157
7,735,135 B1 6/2010 Zhou
(Continued)

FOREIGN PATENT DOCUMENTS

WO 2006/089352 A1 8/2006

OTHER PUBLICATIONS

Velho et al., "Physical Intrusion Detection and Prevention for Android Smartphones", 2015, 16 pages.

*Primary Examiner* — Linglan Edwards
(74) *Attorney, Agent, or Firm* — Trop, Pruner & Hu, P.C.

(57) ABSTRACT

Examples disclosed herein relate to performing a security action based on a comparison of digital signatures. An intrusion detection mode is initiated by a baseboard management controller. A first digital signature of hardware devices is calculated during the activation of the intrusion detection mode. The first digital signature is stored. Upon detection of a trigger, a second digital signature is calculated for the current hardware devices. The digital signatures are compared. A security action is performed based on the comparison.

20 Claims, 2 Drawing Sheets

(51) Int. Cl.
  *H04L 9/08* (2006.01)
  *H04L 9/32* (2006.01)

(52) U.S. Cl.
  CPC .......... *H04L 9/3215* (2013.01); *H04L 9/3226* (2013.01); *H04L 9/3247* (2013.01); *H04L 9/3271* (2013.01); *G06F 9/4401* (2013.01); *G06F 2221/034* (2013.01)

(56) References Cited

U.S. PATENT DOCUMENTS

| | | | | |
|---|---|---|---|---|
| 8,266,676 | B2* | 9/2012 | Hardjono | H04L 63/1433 |
| | | | | 713/181 |
| 8,726,407 | B2 | 5/2014 | Etchegoyen | |
| 8,751,412 | B2 | 6/2014 | Meaney et al. | |
| 8,995,670 | B2 | 3/2015 | Lambert et al. | |
| 9,037,839 | B2* | 5/2015 | Shimatani | G06F 9/4401 |
| | | | | 713/1 |
| 9,225,732 | B2 | 12/2015 | Beyah et al. | |
| 9,292,277 | B2* | 3/2016 | Landry | G06F 8/654 |
| 9,396,200 | B2 | 7/2016 | Jacoby et al. | |
| 9,398,039 | B2 | 7/2016 | Kamthe | |
| 9,876,645 | B1* | 1/2018 | Ramalingam | G06F 21/57 |
| 10,243,747 | B2* | 3/2019 | Ramalingam | G06F 21/645 |
| 10,621,351 | B2* | 4/2020 | Pearson | G06F 21/575 |
| 10,819,719 | B2* | 10/2020 | Garry | H04L 63/1416 |
| 2003/0120918 | A1* | 6/2003 | VanDer Kamp | G06F 21/80 |
| | | | | 713/164 |
| 2007/0143629 | A1* | 6/2007 | Hardjono | H04L 63/0823 |
| | | | | 713/181 |
| 2009/0172639 | A1* | 7/2009 | Natu | G06F 21/57 |
| | | | | 717/120 |
| 2012/0198514 | A1* | 8/2012 | McCune | G06F 21/57 |
| | | | | 726/1 |
| 2012/0297205 | A1* | 11/2012 | Yuen | G06F 21/44 |
| | | | | 713/193 |
| 2014/0200929 | A1 | 7/2014 | Fitzgerald et al. | |
| 2014/0304520 | A1 | 10/2014 | Bobzin et al. | |
| 2014/0365780 | A1* | 12/2014 | Movassaghi | H04W 4/50 |
| | | | | 713/184 |
| 2018/0025344 | A1 | 1/2018 | L. et al. | |
| 2018/0159690 | A1 | 6/2018 | Ramalingam et al. | |
| 2018/0322271 | A1* | 11/2018 | Arora | H04L 63/0861 |
| 2019/0227003 | A1* | 7/2019 | Ghasr | G07D 7/1205 |

* cited by examiner

BASEBOARD MANAGEMENT CONTROLLER TO PERFORM SECURITY ACTION BASED ON DIGITAL SIGNATURE COMPARISON IN RESPONSE TO TRIGGER

CROSS-REFERENCE TO RELATED APPLICATION

This application is a Continuation of U.S. application Ser. No. 15/883,519, filed on Jan. 30, 2018, the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

Service providers and manufacturers are challenged to deliver quality and value to consumers, for example by providing access to computing capabilities. A data center is a facility used to house computer networks, computer systems, and associated components, such as telecommunications and storage systems. Datacenters, offices, etc. can be end locations for computing devices manufactured by a manufacturer. Computing devices may be attacked via physical means at its endpoint, e.g., a datacenter, or in transit.

BRIEF DESCRIPTION OF THE DRAWINGS

The following detailed description references the drawings, wherein.

DETAILED DESCRIPTION

Figure 1:
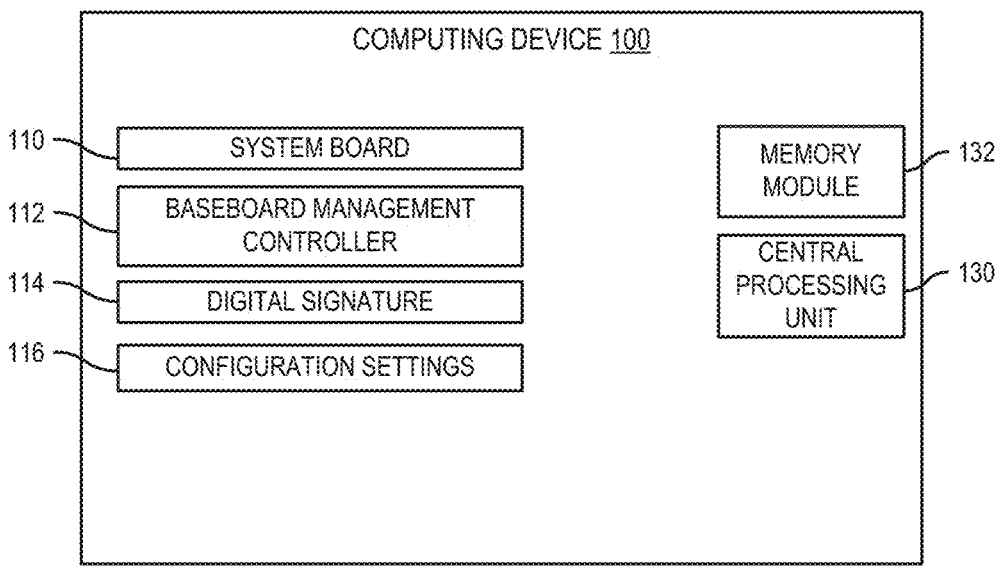
FIGS. 1 and 2 are block diagrams of computing devices capable of comparing digital signatures of hardware devices to perform a security action, according to various examples.

Service providers and manufacturers are challenged to deliver quality and value to consumers, for example by providing access to computing capabilities. A data center is a facility used to house computer networks, computer systems, and associated components, such as telecommunications and storage systems. Datacenters, offices, warehouses, etc. can be end locations for computing devices provided by a manufacturer. Computing devices may be attacked at its endpoint, e.g., a datacenter, or in transit.

Further, insider attacks can cause significant damage and is continuously increasing. Supply chain security concerns is a big issue with many users of computing devices looking for solutions that provide assurance that a computing device such as a server is not modified during transit after shipped from a secure manufacturing facility or at a site. Physical security also continues to be a concern in some segments and advanced physical attack intrusion solutions without compromising usability and flexibility can be beneficial.

Accordingly, approaches described herein relate to an advanced physical intrusion detection solution that helps to detect physical attacks on a computing device with or without an intrusion detection latch to detect supply chain and production mode physical attacks intended to modify hardware, firmware and/or configuration of the computing device. The approach can use a digital signature, configurable system modes, embedded intrusion detection analysis, a trusted cloud service to detect physical intrusions, combinations thereof, etc. to provide smart alerts (e.g., intrusion alerts) and provide physical security confidence for the computing device.

In one example, the computing device creates a digital signature of a data block containing the hardware, firmware, and configuration inventory and stores the digital signature in a secure area when an intrusion detection mode is implemented, for example, as a step of the manufacturing process or enabled as part of a user instruction. In one example, the computing devices can support being shipped with an intrusion detection mode (e.g., a supply chain or production mode) to allow detection of physical intrusions when chassis open event is detected using the physical intrusion detection latch or an analysis of computing device and provide a particular security action based on the mode.

As noted, in one example, the configuration of a server to intrusion detection monitoring mode can be a step in the manufacturing process at which point a digital signature of hardware (e.g. memory modules such as dual inline memory modules (DIMMs), hardware types, serial numbers, Input Output (IO) card inventory, storage card inventory, etc.), and associated firmware inventory and/or settings can be calculated and written into a protected non-volatile storage.

In some examples, a backup of the digital signature and a value of the digital signature for the unique serial number identifying the computing device can be maintained in a remote server associated with the manufacturer (e.g., as a cloud service). The cloud service can allow authorized users to retrieve the stored digital signature. For example, if the computing device is locked down during the intrusion detection mode, the cloud service (e.g., implemented via a remote server) can be used to unlock the computing device. In one example, the digital signature can be used to derive a password to unlock the computing device. In some examples, the digital signature is saved in the cloud service to allow for recovery.

Accordingly, in one example, the lockdown mode can be activated and a digital signature taken. The digital signature can be used to lock the computing device (e.g., as a parameter in a token or password generated using a cryptographic suite). The digital signature can be sent to the remote server and/or stored in a secure location of the computing device. The computing device can then be shipped or otherwise set up by the user. When the user starts the computing device, the password or other authentication can be requested. In one example, the password or other authentication can be based on logging into an account on the remote server to obtain the password or token generated to unlock the computing device.

In the example, if the computing device is configured for a heightened response or the lockdown mode, a BMC can implement a challenge/response protocol before continuing with the normal boot of the computing device. This mode can be used, for example, when the computing device is being moved or stored. The response for the challenge from the BMC could be the retrieved by users via a cloud service that ties the computing device to an owner account. Once the correct response is entered, the BMC can verify the configuration (e.g., hardware, firmware and associated configuration) to be the same as the digital signature and will bring the system out of the configured heightened response mode and proceed with the normal operation.

In one example, when the intrusion detection mode is enabled, the computing device will record each of the boot operations and the corresponding digital signature at each boot in a non-volatile memory. In some examples, the non-volatile memory can be protected (e.g., via access limitations restricted to a baseboard management controller (BMC)). In some examples, the digital signature can be collected at other times via a BMC using out of band management. In another example, management firmware of a computing device with physical intrusion detection locks can automatically trigger a configuration compare analysis when a chassis open condition is detected by the intrusion detection latch. In another example, a trigger can occur if the time of the computing device is changed or time is invalid after a system boot (e.g., reflecting attacks that remove the battery to reset an intrusion detection latch condition).

In a further example, when power is applied to a computing device and if a chassis open event is detected or another trigger condition is detected, the computing device can perform one of a number of security actions. In one example, a security action can include a deep configuration compare of the computing device. The deep configuration compare can be performed using an inventory from a current installed hardware and the stored signature at the time of the initiation of the intrusion detection mode. In one example, if there is a change in the signature and the system is in the intrusion detection mode, a particular security response can be taken. For example, the computing device can log/alert to indicate potential breach with details of the missing part and/or the details of the exact configuration change that was detected within the computing device. In some examples, the logs/alerts can also specify how many reboots have happened in the computing device using the digital signature history from the time of activation of the intrusion detection mode.

In another example, the computing device can be configured to a production mode with the intrusion detection mode enabled. In this mode, the BMC can provide an option to put a computing device into a mode to activate physical intrusion analysis based on certain triggers. In certain examples, the triggers can include a power on event, a system reboot event, a chassis removed event generated by a physical intrusion detected latch, etc. The turning on the intrusion detection mode for the computing device in production can be protected by authentication and authorization including the use of multi-factor authentication.

To enable the mode, a security officer or other user can enable the mode, for example, using a BMC interface, another firmware interface, etc. The BMC can compute the current digital signature of the hardware, firmware, configuration information, combinations thereof, etc. and store the digital signature in a non-volatile storage. In some examples, other details can be stored as well, for example, time of activation. In another example, the BMC can be configured to store the digital signature of the configuration data and inventory signature. In one example, a response in the challenge response protocol can be derived from the inventory signature encrypted by a key. In some examples, the user can configure the action to be taken by the BMC when an intrusion is detected with the system in the intrusion detection mode. An example action that can be configured includes putting the computing device into a contained mode based on the detected state change and/or sending alerts to preconfigured destinations or shutting down the server. In the contained mode, a security officer is required to intervene and respond to the challenge response protocol of the BMC.

Other security actions can include the determination of a missing part that caused a change between signatures or the details of the exact configuration change that was detected within the computing device. A configuration compare can also consider the health of the computing device during configuration compare to detect chassis opening events that may involve repair by reinserting loose devices.

The logs/alerts can also specify the number of reboots from the activation of the intrusion detection mode and the time between the server switch off operation and next reboot, which may indicate abnormal behavior if repairs are carried with server in intrusion detection mode. For systems with an intrusion detection hardware latch, when the intrusion detection mode is off, the BMC may still send a warning security alert whenever it detects an opening of the chassis to capture maintenance operation state that involve hardware replacement/removal.

Figure 2:
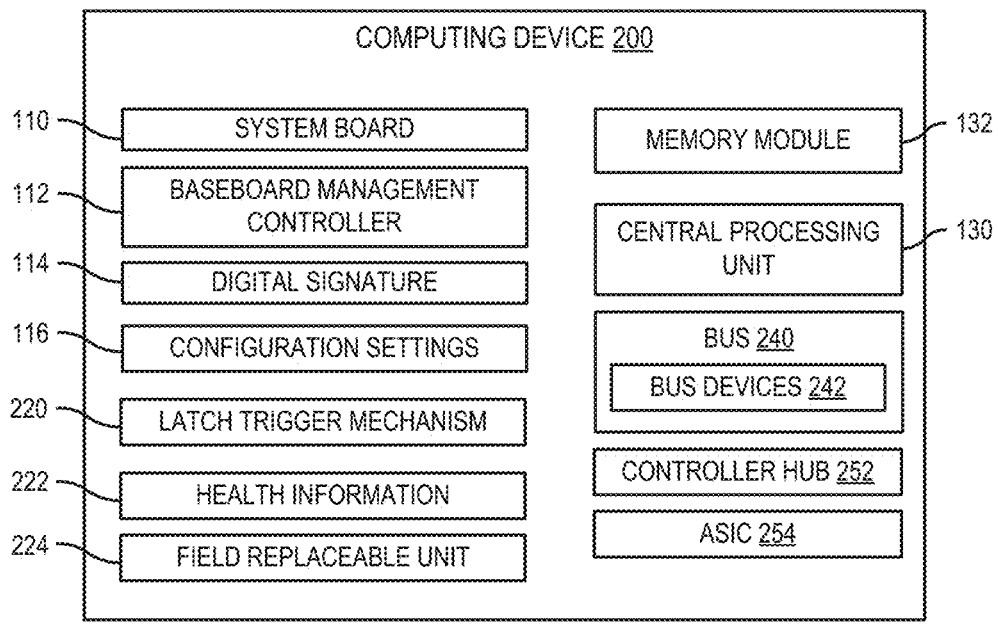

FIGS. 1 and 2 are block diagrams of computing devices capable of comparing digital signatures of hardware devices to perform a security action, according to various examples. Computing device 100 includes a system board 110, a baseboard management controller 112, a digital signature 114, configuration settings 116, at least one central processing unit 130, and a memory module 132. Computing device 200 also includes a latch trigger mechanism 220, health information 222, a field replaceable unit 224, a bus 240 with one or more bus devices 242, a controller hub 252, and one or more application specific integrated circuit (ASIC) 254.

In some examples, the BMC 112 can be used to implement services for the computing device 100, 200. BMC 112 can be implemented using a separate processor from the central processing unit(s) (CPUs) 130 that is used to execute a high level operating system. BMCs can provide so-called "lights-out" functionality for computing devices. The lights out functionality may allow a user, such as a systems administrator, to perform management operations on the computing device 100, 200 even if an operating system is not installed or not functional on the computing device 100, 200. Moreover, in one example, the BMC 112 can run on auxiliary power, thus the computing device 100, 200 need not be powered on to an on state where control of the computing device 100, 200 is handed over to an operating system after boot. As examples, the BMC 112 may provide so-called "out-of-band" services, such as remote console access, remote reboot and power management functionality, monitoring health of the system, access to system logs, and the like. As used herein, a BMC 112 has management capabilities for sub-systems of a computing device 100, 200, and is separate from the CPU 130 that executes a main operating system of a computing device (e.g., a server or set of servers).

As noted, in some instances, the BMC 112 may enable lights-out management of the computing device 100, 200, which provides remote management access (e.g., system console access) regardless of whether the computing device 100, 200 is powered on, whether a primary network subsystem hardware is functioning, or whether an OS is operating or even installed. The BMC 112 may comprise an interface, such as a network interface, and/or serial interface that an administrator can use to remotely communicate with the BMC 112. As used herein, an "out-of-band" service is a service provided by the BMC 112 via a dedicated management channel (e.g., the network interface or serial interface) and is available whether the computing device 100, 200 is in powered on state.

In some examples, a BMC 112 may be included as part of an enclosure. In other examples, a BMC 112 may be included in one or more of the servers (e.g., as part of the management subsystem of the server) or connected via an interface (e.g., a peripheral interface). In some examples, sensors associated with the BMC 112 can measure internal physical variables such as humidity, temperature, power supply voltage, communications parameters, fan speeds, operating system functions, or the like. In other examples, the BMC 112 can collect and store log information, for example, log information associated with health of the computing device 100. The BMC 112 may also be capable to reboot or power cycle the device. As noted, the BMC 112 allows for remote management of the device, as such, notifications can be made to a centralized station using the BMC 112 and passwords or other user entry can be implemented via the BMC 112.

The Operating System is a system software that manages computer hardware and software resources and provides common services for computer programs. The OS can be executable on CPU 130 and loaded to memory modules 132. The OS is a high level OS such as LINUX, WINDOWS, UNIX, a bare metal hypervisor, or other similar high level software that a boot firmware engine of the computing device 100, 200 turns control of the computing device 100, 200 to.

In one example, an entity initiates putting the computing device 100, 200 into an intrusion detection mode in which an inventory of the computer system is taken by the BMC 112 to create a digital signature. The BMC 112 can activate the intrusion detection mode. During activation of the intrusion detection mode, a first digital signature is calculated of the hardware devices, one or more configuration settings 116 of the computing device 100, 200, at least one firmware version of firmware of the computing device 100, 200, combinations thereof, etc.

As used herein, the system board 110 is the main printed circuit board used for the computing device 100, 200 and allows communication between many of the components of the computing device, for example, the CPU 130, the memory module 132, peripherals, bus devices 242, etc. A number of hardware devices can be coupled to the system board 110. In some examples, a controller hub 252 can be an I/O controller hub, for example a southbridge. The controller hub may be used to manage data communications between a CPU 130 and other components of the system board 110. In some examples, a controller hub 252 may have direct media interface to a northbridge device or the CPU. Further the controller hub 252 may provide peripheral support for the computing device 200, such as bus connections like Universal Serial Bus (USB), Peripheral Component Interconnect (PCI), PCI express, PCI extended, serial AT attachment, audio circuitry, integrated Ethernet, enhanced host controller interfaces, combinations thereof, etc.

Examples of devices or components of the computing device 200 include bus devices 242 on one or multiple bus 240 (e.g., a PCIe bus), field replaceable units, a northbridge device, other ASICs 254, etc. As used herein, a field replaceable unit is a circuit board, part, or assembly that can be easily removed from a computing device 200 and replaced by a user or technician without having to send the whole computing device to a repair facility. Examples of FRUs include parts that can attach to other parts of the computing device 200 using a socket, a card, a module, etc. Further, examples of FRUs can include computing modules, memory modules, peripheral cards and devices, etc. In some examples, the system logs can include registers that provide particular information (e.g., an error flag for a particular component, a type of error, a current configuration, a location associated with an error, etc.). FRUs may include one or multiple unique identifiers (e.g., a serial number).

As used herein a memory module 132 is a component that can store information. The memory module 132 can be volatile or non-volatile. Further, the memory module 132 may be addressable by a central processing unit 130 of the computing device 100, 200. An example of a memory module 132 includes a DIMM.

In one example, the BMC 112 can interrogate (e.g., send a query and receive a response) to and from each of the components (e.g., hardware devices, firmware versions, configuration settings, etc.) to be inventoried. This may be performed by a particular sequence to ensure that each hardware device is detected and inventoried. In some examples, one or more buses 240 on the computing device 100, 200 can be searched for components and then the components can be inventoried. As used herein, a bus 240 is a communication system that transfers data between components inside the computing device 100, 200. Buses can include a PCIe bus, a memory bus, a universal serial bus, etc. Moreover, in some examples, other microcontrollers or firmware (e.g., platform firmware such as a basic input output system (BIOS)) can be used to detect and inventory hardware devices coupled to the computing device 200. For example, the BMC 112 can request part or all of the inventory to be taken by the BIOS or other controller.

In some examples, a bus device 242 can be included in a bus 240. As used herein, a peripheral device is a component that is not part of the essential computer (e.g., a main memory or central processing unit). An example of a peripheral device on a bus is a PCIe integrated network card or a PCIe graphics accelerator. In some examples, the BMC 112 is not directly connected to the hardware device to be interrogated and another component (e.g., the controller hub 252) and/or one or more bus can act as an intermediary between the BMC 112 and the hardware devices.

In some examples, the configuration settings can include values for all security settings, hardware enabled, hardware speed settings, voltage settings, license settings, etc. In other examples, the configuration settings inventoried can include a subset of configuration settings 116 that would normally not change between boots or with usage. In some examples, the inventory may also include at least one firmware version identifier for one or multiple firmware implemented on the computing device 200. A firmware version identifier can be an identifier of a version of the firmware being implemented on a particular component or a digital signature of an installed and approved firmware. This can protect from a malicious entity attempting to downgrade firmware to circumvent protections.

In some examples, the inventory can include one or more unique identifiers (e.g., serial numbers) of the respective components. In other examples, the inventory can include other static information about the component. A data structure can be used to incorporate the inventory. The first digital signature can be created for the inventory that is taken. A digital signature is a mathematical approach for demonstrating the authenticity of a digital message or document (e.g., the inventory). A modern cryptographic protocol suite can be used to calculate the signature from the inventory. The BMC 112 can cause storage of the digital signature. Further, in some examples, the BMC 112 can cause storage of the inventory. The storage can be in a non-volatile memory. Thus, the BMC 112 can store the digital signature and/or inventory in a non-volatile memory. Moreover, in some examples, the memory can be secure, for example, in a location only the BMC 112 can access, in a trusted platform module, or the like.

In some examples, the digital signature and/or inventory can be stored on a remote server as well. In one example, the information can be tied to a user account. Further, a unique identifier (e.g., a serial number) associated with the computing device 200 can be used to index the information. As such, the remote server can be a location that the BMC 112 stores the digital signature.

In some examples, security actions can be configured and customized as further detailed below. In some examples, security action may be pre-determined, in other examples, the security action may be customized as part of the activation of the intrusion detection mode. When the activation of the intrusion detection mode is complete, the BMC 112 can be set to monitor events that can help identify intrusions. Further, smart alerts can be sent to a user based on the monitoring. In some examples, the BMC 112 can record historical information, for example, take an inventory and store a digital signature on each boot of the computing device 200.

The BMC 112 detects a trigger during monitoring. In one example, the BMC 112 can react to a latch trigger mechanism 220 being triggered. A latch trigger can include a switch or other circuit that can be triggered when the computing device is opened. In another example, a custom intrusion trigger indicative of opening of the computing device 200 can be used. In one example, the intrusion trigger can be a detection of an adverse time condition. For example, if a time value of the computing device 200 is reset or unexpectedly changes (e.g., because of removal of a battery), this can be a trigger indicative of a possible physical intrusion. In another example, particular alterations to the configuration (e.g., a missing or disabled FRU, particular security settings, etc.) can be used as an intrusion trigger. In further examples, a trigger can be periodic or in response to an event, such as boot of the system. Because the BMC 112 can operate even while the computing device 200 is not fully powered on, the process may be implemented out of band, for example, allowing for the system to power on but not boot past a certain level to enable searching for hardware and configuration changes, but not booting to an operating system.

In one example, upon detection of a trigger, the BMC 112 can calculate a second digital signature of currently detected hardware devices, configuration settings, and firmware. As used herein, the term "currently detected" refers to the hardware devices, configuration settings, and firmware detected on the computing device 200 in response to the trigger. As noted, the approach used to search for the devices, configuration settings, and firmware versions that are detected can correspond to the approach above used for detecting hardware devices.

The BMC 112 can compare the first digital signature with the second digital signature. In one example, if the two digital signatures match, a first security action can be taken and if the signatures do not match a second security action can be taken.

In one example, the signatures match, which would indicate that there was an anomaly detected, but there is a high confidence that there was no change in the system. As such, a notification can be sent to a user (e.g., via a log message, an email, a management system, on screen, etc.) identifying the trigger and that there was no change found.

In another example, the signatures do not match. In this example, a notification can be sent identifying the trigger and that there was a change. In one example, the BMC 112 can further compare the inventories to determine a change between the two signatures. The change can be identified in the notification.

In one example, the change can occur in a FRU. In the example, a priority can be associated with the notification. For example, health monitoring aspects of the BMC 112 can identify that there is an error condition associated with the FRU. The BMC 112 can determine that the change included replacement of the FRU (e.g., identified by a change in serial number). The priority of the notification sent can be determined based on the health status. For example, an unknown change or a change not related to a health status can have a higher alert priority than a replacement of a FRU what has a health issue (e.g., a logged error condition).

Further, an amount of time that the computing device 200 was not in operation when the FRU was replaced can be used to adjust the priority. For example, acceptable maintenance time parameters can be kept in a data structure (e.g., a table). If the down time for the computing device 200 time parameters is not within the parameters, it can indicate that there was a possible malicious intrusion and the notification can be associated with a higher alert priority.

In another example, the BMC 112 can operate the intrusion detection mode in a lockdown mode. In the lockdown mode, a user would be required to authenticate via a system to prove that the user have authorization to continue with a boot process for the computing device 200 when a comparison indicates that an intrusion occurred. In one example, the user may be required to furnish a password or token via a remote server that had originally stored the first digital signature. In some examples, the password or token can be based on the first digital signature (e.g., derived from the first digital signature or used as a parameter for determining the password or token using a cryptographic suite).

In some examples, the computing devices 100, 200 can also include Input/Output interfaces, which may be used to communicate with other devices, for example, via a network, provide audible information, provide visual information, etc. The input/output interfaces may also be used to implement other input/output, for example, storage functionality (e.g., access to one or multiple storage arrays).

In one example, the BMC 112 may be associated with a secure storage, a hardware root of trust, or other security features. In one example, on initial boot of the computing device 200 into a service operating system (OS) or provisioning engine in a factory, a unique private and public key are generated and 'glued' onto the system by being saved into the BMC storage. This storage can be persistent and not replaceable. The BMC 112 may allow access to a key using an application programming interface. The values can be written to a write once register on a same Application Specific Integrated Circuit (ASIC) as the BMC. The write once register can be implemented, for example, using fuses. In one example, the private key is created by executing an algorithm using random sources and is programmed. In another example, the public key is a cryptographic hash of the private key. In some examples, once programmed, the ability to change the registers is disabled (e.g., severing a fuseable link, for example, on a write line). In some examples, the BMC 112 can be used to ensure that firmware of the computing device 200 is secure (e.g., by ensuring that firmware is not updated unless it is signed or encrypted using a public key that the private key of the BMC 112 can decrypt. Further, in some examples, the BMC 112 can stop the computing device 200 from booting with compromised firmware.

The computing device 200 may include a processing element that may be one or multiple central processing unit (CPU) or a combination of a CPU and other components such as a graphics processing unit (GPU), or microprocessor suitable for retrieval and execution of instructions and/or electronic circuits configured to perform the functionality described herein. In some examples, a firmware engine corresponding to platform firmware such as a BIOS may be implemented as a series of instructions encoded on a machine-readable storage medium of computing device 100, 200 and executable by CPU 130.

In some examples, a silicon root-of-trust feature supported by the computing device is used to ensure that the firmware on the computing device 100, 200 is not compromised. The silicon root-of-trust ensures that the BIOS and BMC Firmware cannot be replaced with non-authentic BIOS and BMC Firmware even with physical access to the system.

A communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s). Computing devices can connect to other devices using the communication network.

By way of example, devices communicate with each other and other components with access to the communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

Figure 3:
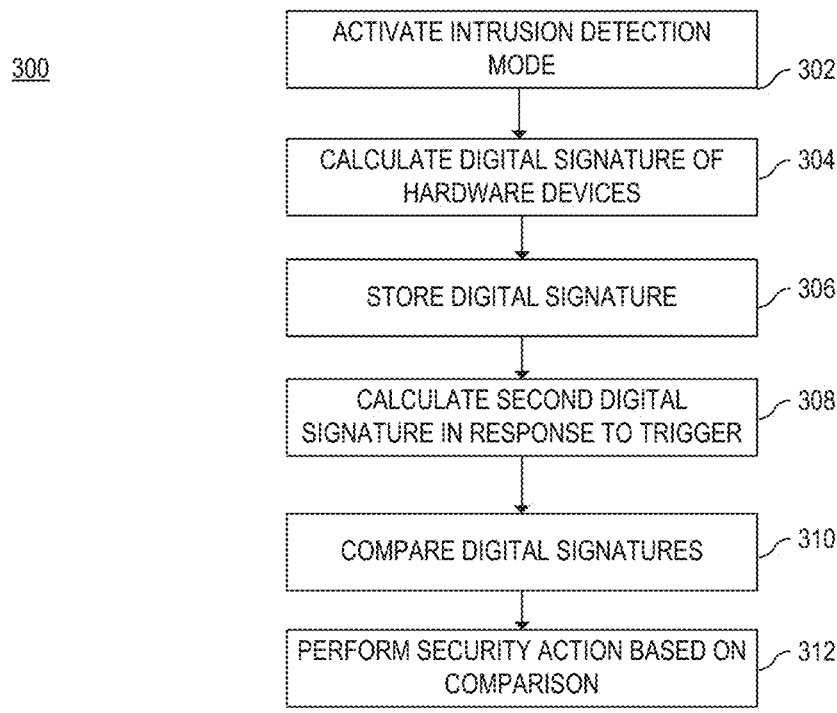
FIG. 3 is a flowchart of a method for performing a security action based on a comparison of digital signatures of hardware devices of a device, according to an example.
Figure 4:
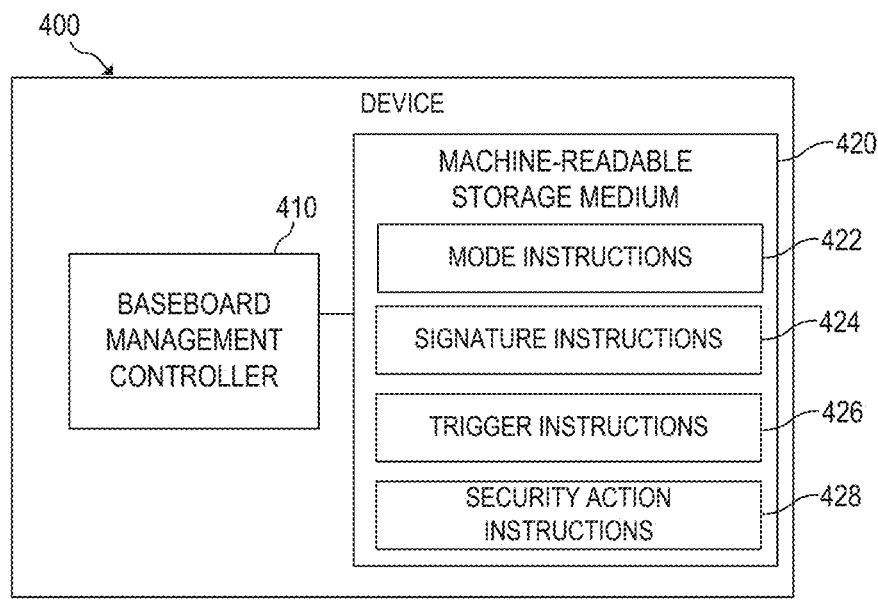
FIG. 4 is a block diagram of a device with a baseboard management controller capable of executing a method to perform a security action based on a comparison of digital signatures of hardware devices of a device, according to an example.

FIG. 3 is a flowchart of a method for performing a security action based on a comparison of digital signatures of hardware devices of a device, according to an example. FIG. 4 is a block diagram of a device with a baseboard management controller capable of executing a method to perform a security action based on a comparison of digital signatures of hardware devices of a device, according to an example.

The device 400 includes, for example, a BMC 410, and a machine-readable storage medium 420 including instructions 422, 424, 426, 428 for performing a security action based on a comparison of inventories. Device 400 may be, for example, a server, a notebook computer, a slate computing device, or any other computing device capable of performing the features described herein.

In certain examples, BMC 410 may be separate from a central processing unit (CPU) used to execute a high level OS of the device. The BMC 410 can be a physical device.

BMC 410 may fetch, decode, and execute instructions 422, 424, 426, 428 to implement method 300. As an alternative or in addition to retrieving and executing instructions, BMC 410 may include at least one integrated circuit (IC), other control logic, other electronic circuits, or combinations thereof that include a number of electronic components for performing the functionality of instructions 422, 424, 426, 428.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, non-volatile memory, a flash device, and the like. As such, the machine-readable storage medium can be non-transitory. As described in detail herein, machine-readable storage medium 420 may be encoded with a series of executable instructions for performing method 300.

Although execution of method 300 is described below with reference to device 400, other suitable components for execution of method 300 can be utilized (e.g., computing device 100, 200). Method 300 may be implemented in the form of executable instructions stored on a machine-readable storage medium, such as storage medium 420, and/or in the form of electronic circuitry.

The device 400 can be in a mode where it can take input. The input can be used by the BMC 410 to activate an intrusion detection mode (e.g., a secure mode, a transit mode, a rest mode, etc.). As part of implementation of the mode, at 302, BMC 410 can execute mode instructions 422 to enable the mode.

At 304, signature instructions 424 are executed to inventory the device 400 and calculate a digital signature as detailed above. The device 400 can include a number of hardware devices coupled to a system board, for example, one or more memory module, one or more CPU, one or more FRUs, etc. The inventory can be based on a number of unique identifiers associated with particular hardware devices of the device 400, the system board, etc. For example, at least one unique identifier can be associated with each main memory module installed on the device, each processor installed on the device, the system board of the device, each of a number of bus devices in a bus of the device, combinations thereof, etc.

Further, as noted above, the inventory can be based on one or multiple configuration settings. Moreover, in some examples, version information about one or multiple firmware implemented on the device can be included in the inventory. At 306, the digital signature is caused to be stored. In one example, the digital signature is stored in a non-volatile memory of the device. In another example, the digital signature can be caused to be stored in a remote server. As noted above, in some examples, the inventory can be stored as well.

Once the mode is enabled, the BMC 410 can be used to monitor the device to determine whether a trigger as described above occurs by executing trigger instructions 426. At 308, the BMC 410 calculates a second digital signature of the device 400. The second digital signature can be based on an inventory of the current hardware devices, configuration settings, and firmware versions of the device. The inventory can include looking for the same information sought out in original process used to calculate the digital signature.

At 310, signature instructions 424 can be used to compare the first and second digital signature. In some examples, the first digital signature is locally stored, in others the first digital signature is stored at the remote server and retrieved. In some examples, the retrieval process can include signing into an account that is tied to the device. At 312, security action instructions 428 can be executed to perform a security action based on the comparison.

In one example, the intrusion detection mode has a smart notification setting. In this mode, when the comparison detects a change, the inventory can also be compared. The inventory comparison can determine a change in the computing device between the signatures. In the example, the BMC 410 can output a notification (e.g., via a log, a display, an email, etc.) including information about the change. As detailed above, the notification can be associated with a priority and the priority can be modified based on health information about the device and/or maintenance information associated with a replacement of an FRU.

In another example, the intrusion detection mode can implement a lockdown mode. In this example, the trigger can be power on of the device 400 to a boot process. The BMC 410 can authenticate a user to ensure that the user has authorization to continue to the boot process for the computing device when the comparison is indicative of an intrusion prior to allowing the device to boot to an operating system. In a further example, a remote server can store information to authenticate the user. For example, a user can have an account that is linked to the device. In one example, the link can occur or be confirmed at the time of activation of the intrusion detection mode. As described above, a password or token from the account can be used to unlock the computing device and allow the boot process to complete and boot to the operating system.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A computing device comprising:
   a system board;
   a plurality of hardware devices coupled to the system board, wherein the plurality of hardware devices includes at least one memory module, at least one central processing unit, and at least one baseboard management controller separate from the central processing unit,
   wherein the baseboard management controller is to:
      activate an intrusion detection mode;
      during activation of the intrusion detection mode, calculate a first digital signature of the hardware devices, a plurality of configuration settings of the computing device, and at least one firmware version of the computing device;
      cause storage of the first digital signature;
      in response to a trigger, calculate a second digital signature of a plurality of currently detected hardware devices of the computing device, a plurality of currently detected configuration settings of the computing device, and at least one current firmware version of the computing device; and
      perform a security action in response to the second digital signature not matching the first digital signature.

2. The computing device of claim 1, wherein the trigger is at least one of: a latch detection or an adverse time condition.

3. The computing device of claim 1, wherein the baseboard management controller is further to:
   authenticate a user with authorization to continue a boot process for the computing device when a comparison of the first digital signature and the second digital signature is indicative of an intrusion prior to allowing the computing device to boot an operating system.

4. The computing device of claim 3, wherein the authentication is responsive to a password based on the first digital signature.

5. The computing device of claim 1, wherein the baseboard management controller is further to:
   store, at a remote server, the first digital signature at a time of activation of the intrusion detection mode; and
   retrieve the first digital signature from the remote server for a comparison of the first digital signature with the second digital signature.

6. The computing device of claim 1, wherein the baseboard management controller is further to store a digital signature generated at each boot of the computing device.

7. The computing device of claim 1, wherein the first digital signature is based on at least corresponding unique identifiers of the plurality of hardware devices.

8. The computing device of claim 1, wherein the baseboard management controller is included within an enclosure of the computing device and is to perform management operations with respect to subsystems of the computing device while the computing device is powered off.

9. The computing device of claim 1, wherein the plurality of configuration settings comprises a hardware speed setting of the computing device, and wherein the first digital signature is based on the hardware speed setting.

10. The computing device of claim 1, wherein the first digital signature is cryptographically calculated based on information of the plurality of hardware devices, the plurality of configuration settings, and the at least one firmware version.

11. A non-transitory machine-readable storage medium storing instructions that, if executed by a baseboard management controller of a computing device, cause the baseboard management controller to:
   activate an intrusion detection mode,
   wherein the baseboard management controller is within an enclosure of the computing device and is separate from at least one central processing unit within the enclosure of the computing device, and
   wherein the computing device includes a plurality of hardware devices coupled to a system board, wherein the plurality of hardware devices includes at least one memory module and the at least one central processing unit;
   during activation of the intrusion detection mode, calculate a first digital signature of the plurality of hardware devices, a plurality of configuration settings of the computing device, and at least one firmware version of the computing device;
   cause storage of the first digital signature;
   in response to a trigger, calculate a second digital signature of a plurality of currently detected hardware devices of the computing device, a plurality of currently detected configuration settings of the computing device, and at least one current firmware version of the computing device; and perform a security action in response to the second digital signature not matching the first digital signature.

12. The non-transitory machine-readable storage medium of claim 11, wherein the trigger is at least one of: a latch detection or an adverse time condition.

13. The non-transitory machine-readable storage medium of claim 11, wherein the instructions if executed cause the baseboard management controller further to:

determine a change in the computing device between a time when the first digital signature was calculated and a time when the second digital signature was calculated; and output a notification including the change.

14. The non-transitory machine-readable storage medium of claim 11, wherein the instructions if executed cause the baseboard management controller to:

perform the security action that comprises identifying a missing component in the computing device in response to the second digital signature not matching the first digital signature.

15. The non-transitory machine-readable storage medium of claim 11, wherein the instructions if executed cause the baseboard management controller is further to:

retrieve the first digital signature from a remote server for a comparison of the first digital signature with the second digital signature.

16. The non-transitory machine-readable storage medium of claim 11, wherein the first digital signature is based on at least corresponding unique identifiers of the plurality of hardware devices.

17. A method comprising:

activating an intrusion detection mode by a baseboard management controller of a computing device, wherein the baseboard management controller is separate from at least one central processing unit of the computing device, and wherein the computing device includes a plurality of hardware devices coupled to a system board, wherein the plurality of hardware devices includes at least one memory module and the at least one central processing unit;

during activation of the intrusion detection mode, calculating, by the baseboard management controller, a first digital signature of the hardware devices based on respective unique identifiers associated with the hardware devices, a plurality of configuration settings of the computing device, and at least one firmware version of the computing device;

causing storage of the first digital signature;

in response to a trigger, calculating, by the baseboard management controller, a second digital signature of a plurality of currently detected hardware devices of the computing device, a plurality of currently detected configuration settings of the computing device, and at least one current firmware version of the computing device; and performing a security action in response to the second digital signature not matching the first digital signature.

18. The method of claim 17, further comprising:

determining, by the baseboard management controller, a change in the computing device between a time the first digital signature was calculated and a time the second digital signature was calculated; and outputting a notification including the change.

19. The method of claim 17, wherein the plurality of configuration settings comprises a hardware speed setting of the computing device, and wherein the first digital signature is based on the hardware speed setting.

20. The method of claim 17, further comprising:

storing, at a remote server, the first digital signature at a time of activation of the intrusion detection mode; and retrieving the first digital signature from the remote server for a comparison of the first digital signature with the second digital signature.

* * * * *